June 18, 1968   K. F. VON GRUNBERG ET AL   3,388,927
SERVICE CONNECTIONS FOR TRUCK-SEMITRAILER
FIFTH-WHEEL COUPLINGS
Filed March 22, 1966
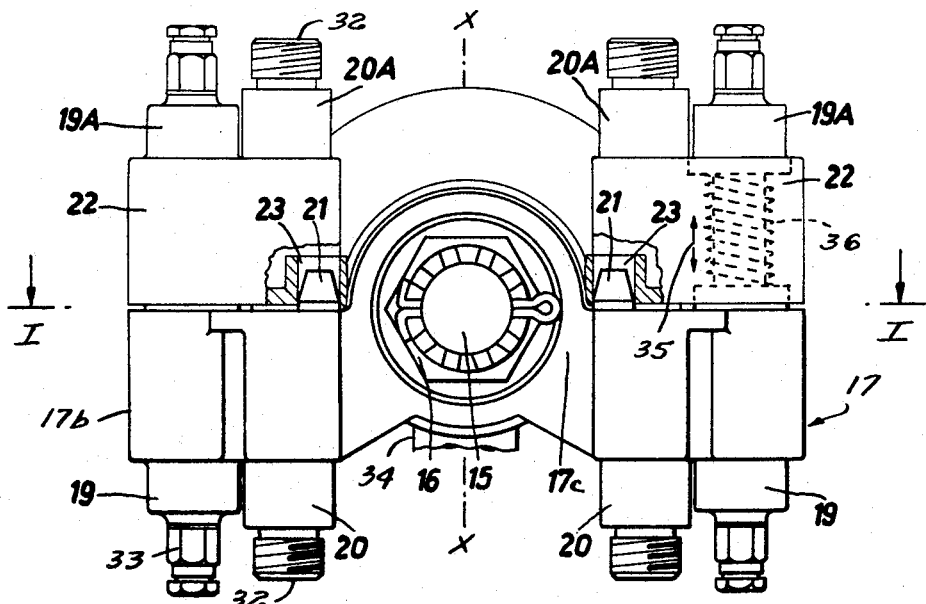
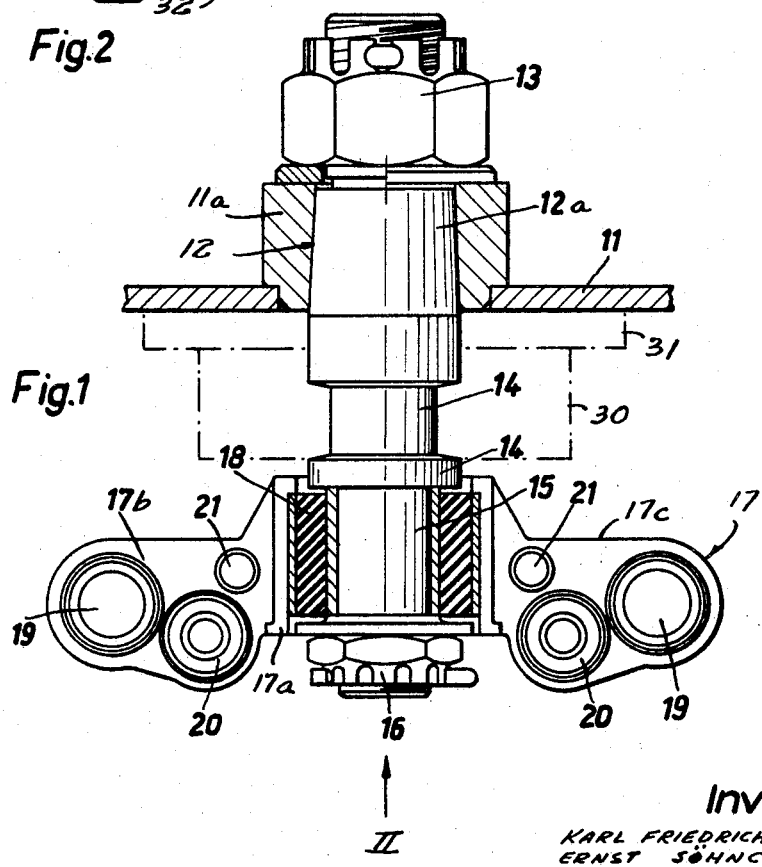
Inventors:
KARL FRIEDRICH von GRÜNBERG
ERNST SÖHNCHEN
BY
Michael J. Striker
ATTORNEY

United States Patent Office 3,388,927
Patented June 18, 1968

3,388,927
SERVICE CONNECTIONS FOR TRUCK-SEMI-
TRAILER FIFTH-WHEEL COUPLINGS
Karl Friedrich von Grunberg, Remscheid, and Ernst
Sohnchen, Huckeswagen, Germany, assignors to Bergische Stahl-Industrie, Remscheid, Germany
Filed Mar. 22, 1966, Ser. No. 536,429
Claims priority, application Germany, Mar. 24, 1965,
B 81,142
12 Claims. (Cl. 280—421)

ABSTRACT OF THE DISCLOSURE

The invention relates to a truck-semitrailer combination which includes a kingpin and a kingpin lock respectively provided on the semitrailer and the truck. An automatic coupling assembly includes a first connecting element provided on the kingpin and a second connecting element provided on the truck. The connecting elements have respective complementary coupling portions which engage one another when the kingpin is received in the lock.

---

The present invention relates to automotive vehicles in general, and more particularly to improvements in connections between a semitrailer and a truck, tractor or another heavy-duty towing vehicle. Still more particularly, the invention relates to a connection which can automatically couple parts of fluid-conveying hoses, current-conducting lines and other types of cooperating components that are provided partly on the towing vehicle and partly on the semitrailer.

When a semitrailer is mechanically connected with a towing vehicle, the driver must relinquish his seat in order to establish necessary connections between the braking and/or current-conducting lines which are provided on the towing vehicle and the corresponding lines of the trailer. Such manual operation is undesirable for many reasons, i.e., not only because manual establishment of proper connections between such lines takes up considerable time but also because the driver might forget and thereby endangers himself, the cargo and the truck-semitrailer combination if the signal lights and/or brakes of the semi-trailer are not in working order. Furthermore, the driver or another person in charge of making the connections might be careless and might properly connect the current-conducting lines without, however, establishing a satisfactory connection between the brake lines, or vice versa.

The connection between the towing vehicle and the semitrailer normally comprises an upper fifth wheel which is mounted at the forward end of the semitrailer, a lower fifth wheel which is provided at the trailing end of the towing vehicle, a kingpin which is provided on the semitrailer, and a kingpin lock which can retain the kingpin when the two fifth wheels are properly positioned with reference to each other. Heretofore known attempts to provide an automatic connection between certain lines of the towing vehicle and the corresponding lines of the semitrailer include the provision of a hollow kingpin which can define a passage for braking fluid and is automatically coupled to a complementary part when the semitrailer is mechanically connected with the towing vehicle. A serious drawback of such proposals is that the provision of passages weakens the kingpin which is undesirable for obvious reasons. Therefore, and in order to make it sufficiently resistant to stresses which arise when a loaded semitrailer is hitched to a towing vehicle, the dimensions of a hollow kingpin must be increased well beyond practical limits. Furthermore, even a very large hollow kingpin cannot accommodate all such conduits, lines and other components which must be provided on a truck-semitrailer combination to insure that all signal generating, braking and other components of the semitrailer can be properly controlled from the driver's seat. This is probably the reason why such kingpins failed to gain widespread acceptance in the trucking industry.

Accordingly, it is an important object of the present invention to provide a truck-semitrailer combination wherein proper connection between one or more electrical lines, fluid-conveying lines and similar components which are provided in part on the towing vehicle and in part on the semitrailer may be established in a fully automatic way in response to establishment of proper mechanical connection between the semitrailer and the truck without in any way weakening, unduly enlarging or otherwise undesirably affecting the configuration and/or strength characteristics of the kingpin.

Another object of the invention is to provide a novel coupling assembly which can be dimensioned and configurated in such a way that it occupies readily available space between a towing vehicle and a semitrailer and which can serve to establish proper connections between any desired number of lines provided in part on the towing vehicle and in part on the semitrailer.

A further object of the invention is to provide a coupling assembly whose elements can be coupled to or disengaged from each other in automatic response to mechanical engagement of the kingpin on the semitrailer with the lock on the towing vehicle.

An additional object of the instant invention is to provide a coupling assembly whose elements are configurated and mounted in such a way that they do not interfere with relative movements between a towing vehicle and a semitrailer and which need not take up any undue stresses when the truck-semitrailer combination travels on rough terrain.

Briefly stated, one feature of the present invention resides in the provision of a truck-semitrailer combination which includes upper and lower fifth wheels respectively provided on the semitrailer and on the truck, a kingpin and a kingpin lock respectively carried by the semitrailer and the truck to provide a separable mechanical connection therebetween when the kingpin is engaged by the lock, and an automatic coupling assembly which comprises a first connecting element provided on the kingpin and a complementary second connecting element provided on the truck. One of these connecting elements carries male coupling portions and the other connecting element carries female coupling portions whereby the female coupling portions receive the corresponding male coupling portions when the connecting elements are brought sufficiently close to each other in response to mechanical engagement between the kingpin and the lock. Thus, instead of providing coupling portions in the interior of the kingpin, the present invention contemplates a coupling assembly one element of which is carried by the kingpin, preferably by the lower end portion of the kingpin which extends below the lock. The connecting element which is carried by the kingpin is preferably rotatable or turnable thereon, and the coupling assembly preferably comprises an elastomeric sleeve or another suitable resilient device which is interposed between the kingpin and the corresponding connecting element to prevent overstressing of the coupling assembly. The male coupling portions may comprise male fluid-conveying nipples, current-conducting plugs, centering plugs or the like, and the female coupling portions may comprise sockets for current-conducting or centering plugs, female nipples and similar devices which can be automatically connected with the corresponding male portions. The coupling portions carried by at least one of the connecting elements may be disposed in mirror symmetry with reference to the central vertical plane of the towing vehicle, i.e., with reference to a plane which includes the axis of the kingpin.

The novel features which are considered as characteristic of the invention are set forth in particular in the appended claims. The improved coupling assembly itself, however, both as to its construction and the mode of manipulating the same, together with additional features and advantages thereof, will be best understood perusal of the following detailed description of a specific embodiment with reference to the accompanying drawings, in which:

FIG. 1 is a vertical section through the fifth wheels of a truck and semitrailer and shows that connecting element which is carried by the kingpin, the section being taken along the line I—I of FIG. 1 as seen in the direction of arrows; and FIG. 2 is a bottom plan view of the coupling assembly as seen in the direction of the arrow II in FIG. 1.

Referring to the drawings in detail, the numeral 11 denotes the upper fifth wheel which is carried by the forward end of a semitrailer. The fifth wheel 11 carries a solid kingpin 12 which is attached thereto by a nut 13. The boss 12a which forms the upper part of the kingpin 12 is of slightly conical shape and is wedged into a complementary bearing sleeve 11a of the fifth wheel 11. The kingpin lock 30 of the towing vehicle engages an intermediate portion 14 of the kingpin 12 when the lower fifth wheel 31 of the towing vehicle is located in requisite position with reference to the fifth wheel 11. The lower end portion 15 of the kingpin 12 is of circular cross section and carries a retaining nut 16 for a first connecting element or carrier 17 which forms part of the novel coupling assembly and has a hub 17a rotatable on the lower end portion 15. A resilient element, here shown as an elastomeric sleeve 18 encased in metallic tubes, is interposed between the hub 17a and the end portion 15 to insure that the connecting element 17 may be tilted within limits and that it can also turn on the kingpin.

The connecting element 17 has two portions or wings 17b, 17c which are mirror symmetrical with reference to a vertical symmetry plane X—X including the axis of the kingpin 12. Each wing carries three horizontally extending male coupling portions 19, 20 and 21 and the coupling portions of each pair of related coupling portions 19—19, 20—20 and 21—21 are also mirror symmetrical with reference to the plane X—X. In the illustrated embodiment, each coupling portion 20 is a male nipple which can be automatically coupled to a complementary female nipple 20A provided on a second connecting element or carrier 22 rigidly supported by the towing vehicle at a level below the lower fifth wheel 31. The nipples 20, 20A can convey a braking fluid to the braking system of the semitrailer and each thereof is formed with an extension 32 which can take the end of a hose, not shown. The coupling portions 19 are male conductors or plugs which can be automatically coupled to female conductors or sockets 19A provided on the connecting element 22. The coupling portions 21 are centering plugs which are of conical shape (see FIG. 1) so that they can find their way into female coupling portions or sockets 23 carried by the connetcing element 22. The axes of all coupling portions 19–21, 19A, 20A and 23 are horizontal and the sleeve 18 maintains the connecting element 17 on the kingpin 12 in such angular position that each male coupling portion 19–21 automatically finds its way into the complementary female coupling portion 19A, 20A, 23 when the kingpin is mechanically connected with the lock 30.

The connecting elements 17, 22 are mounted at the same level above the ground and move into face-to-face abutment in response to proper retention of the kingpin 12. The element 22 may be rigidly secured to the lower fifth wheel 31 or to another part of the towing vehicle.

Proper positioning of the connecting element 17 with reference to the connecting element 22 may be insured by the elastomeric sleeve 18 and/or by hoses connected with the extensions 32 of the nipples 20, 20A as well as by electric cables connected with the terminals 33 of the plugs 19. The wings 17b, 17c of the connecting element 17 are normally held in a plane which is perpendicular to the symmetry plane X—X. The lower fifth wheel 31 has the customary slot (not shown) which permits entry of the intermediate portion 14 so that the latter can be moved into the range of the lock 30 when the towing vehicle is driven in reverse to place the fifth wheel 31 into registry with the fifth wheel 11. The coupling portions 19, 19A and 20, 20A are respectively provided with suitably configurated complementary parts which face each other when the kingpin 12 enters the slot of the fifth wheel 31. Any minor misalignment is eliminated by the conical centering plugs 21 which find their way into the sockets 23 and thereby insure that the coupling portions 19, 20 invariably engage the complementary coupling portions 19A, 20A to establish two fluid-conveying and two current conducting connections. As a rule, the plugs 21 will enter the corresponding sockets 23 shortly before the coupling portions 19, 20 engage the coupling portions 19A, 20A.

The coupling portions 20 and/or 20A may be provided with automatic valves of known design which close in response to disengagement of the connecting elements 17, 22 and which open in automatic response to connection of the coupling portions 20 with the corresponding portions 20A. Such automatic valves are well known and their construction forms no part of the present invention. The fit between each plug 19 and the complementary socket 19A should be tight enough to establish satisfactory electrical connections for the signal lights of the semitrailer and/or other current-consuming devices which receive current from a source mounted on the towing vehicle. The lock 30 insures that the fluid-conveying and current-conducting connections remain intact when the truck-semitrailer combination is in motion, and the sleeve 18 enables the connecting element 17 to remain in abutment with the element 22 when the two conveyances travel in a curve or on rough terrain. In a curve, the kingpin 12 rotates with reference to the element 17. The sleeve 18 allows for other than angular movements of the kingpin, i.e., the latter may be tilted or otherwise displaced (within limits) without affecting the engagement between the male and female coupling portions.

It is clear that the number of coupling portions may be reduced or increased, depending on the type of semitrailer, on the type of braking system on the semitrailer, on the type of the signal lights used on the semitrailer, and other factors. Furthermore, the coupling assembly may include only one centering pin 21 or three or more centering pins. It is also possible to provide on the semitrailer ways 34 (see FIG. 1) extending in the longitudinal direction of the semitrailer to maintain the connecting element 17 in optimum position for engagement by the element 22 in response to mechanical connection of the kingpin 12 with the lock 30. The element 17 may be provided with a lug or like projection for one end of a locating spring (not shown) which is connected with the semitrailer and serves to maintain the element 17 in an angular position in which the common plane of the wings 17b, 17c is normal to the plane X—X, i.e., in an optimum position for engagement with the element 22.

In order to compensate for wear and to prevent transmission of excessive impacts thereto, the coupling portions 19–21 and/or 19A, 20A, 23 may be biased by suitable springs which can yield when a male coupling portion engages the corresponding female coupling portion. FIG. 1 shows, by way of example, that the socket 19A is reciprocable axially (arrow 35) and is biased by a helical spring 36 which tends to move it toward the complementary plug 19. Similar springs may be provided for the remaining female coupling portions and/or for the male coupling portions. It is further clear that the position of one or more male and corresponding female coupling portions may be reversed, i.e., that the element 17 may carry one or more female coupling portions.

Without further analysis, the foregoing will so fully reveal the gist of the present invention that others can, by applying current knowledge, readily adapt it for various applications without omitting features which fairly constitute essential characteristics of the generic and specific aspects of the above outlined contributions to the art and, therefore, such adaptations should and are intended to be comprehended within the meaning and range of equivalence of the following claims.

What is claimed as new and desired to be protected by Letters Patent is:

1. A truck-semitrailer combination, comprising a kingpin and a kingpin of solid cross-section lock respectively provided on the semitrailer and truck to establish a separable mechanical connection therebetween; and an automatic coupling assembly comprising a first connecting element provided on said kingpin and a second connecting element provided on the truck, said connecting elements respectively having complementary coupling portions engaging each other in response to retention of said kingpin by said lock, one of said coupling portions being a first fluid-conveying nipple and the complementary coupling portion being a second fluid-conveying nipple which is fluidtightly engaged by said first nipple in response to engagement of said kingpin by said lock.

2. A combination as set forth in claim 1, wherein said one of said coupling portions is a socket and said complementary coupling portion is a plug which enters into and is centered in said socket when said kingpin is engaged by said lock.

3. A combination as set forth in claim 1, wherein another one of said coupling portions is a current-conducting plug and another complementary coupling portion is a current-conducting socket which is placed into current-conducting contact with said plug in response to engagement of said kingpin by said lock.

4. A combination as set forth in claim 1, further comprising upper and lower fifth wheels respectively connected with the semitrailer and truck, said kingpin extending downwardly from said upper fifth wheel and comprising a lower end portion which carries said first connecting element, said kingpin further having an intermediate portion engageable by said lock.

5. A combination as set forth in claim 4, wherein said first connecting element is rotatable on the lower end portion of said kingpin.

6. A combination as set forth in claim 4, wherein at least said first connecting element comprises two portions which are mirror symmetrical with reference to a plane including the axis of said kingpin.

7. A combination as set forth in claim 6, wherein each of said connecting elements comprises a plurality of coupling portions and wherein such coupling portions are disposed in pairs, the coupling portions of each pair on said one connecting element being mirror symmetrical with reference to said plane.

8. A combination as set forth in claim 1, wherein each of said connecting elements comprises a plurality of coupling portions and wherein at least one of said coupling portions is reciprocable with reference to the remainder of the respective connecting element, and further comprising resilient means for biasing said one coupling portion toward the complementary coupling portion on the other connecting element.

9. A combination as set forth in claim 1, wherein said second connecting element is rigidly connected with the truck and wherein each of said coupling portions has a horizontal axis.

10. A combination as set forth in claim 1, wherein each of said connecting elements comprises a plurality of different types of coupling portions.

11. A truck-semitrailer combination, comprising an upper and a lower fifth wheel respectively connected with said semitrailer and said truck; a kingpin provided on and extending downwardly from said upper fifth wheel and having a lower end portion and an intermediate portion and a kingpin lock provided on said truck to establish a separable mechanical connection between said truck and said semitrailer; and an automatic coupling assembly comprising a first connecting element carried by said lower end portion of said kingpin and a second connecting element provided on said truck, said connecting elements respectively having complementary coupling portions, and said coupling portions engaging one another in response to engagement of said intermediat portion of said kingpin by said kingpin lock and retention of said kingpin by said lock.

12. A combination as set fotrh in claim 11, wherein said lower end portion is of circrlar cross section and said resilient means comprises a sleeve consising of elastomeric material and surrounding said lower end portion.

References Cited

UNITED STATES PATENTS

| | | | |
|---|---|---|---|
| 1,973,610 | 9/1934 | Conners | 280—421 |
| 2,094,399 | 9/1937 | Fuch | 280—421 |
| 2,363,851 | 11/1944 | Barnhart et al. | 280—421 |
| 2,480,483 | 8/1949 | Kirksey | 280—421 |

LEO FRIAGLIA, *Primary Examiner.*